(No Model.)
T. D. WILLIAMS.
UNDERGROUND CONDUIT FOR ELECTRIC WIRES.
No. 330,277. Patented Nov. 10, 1885.
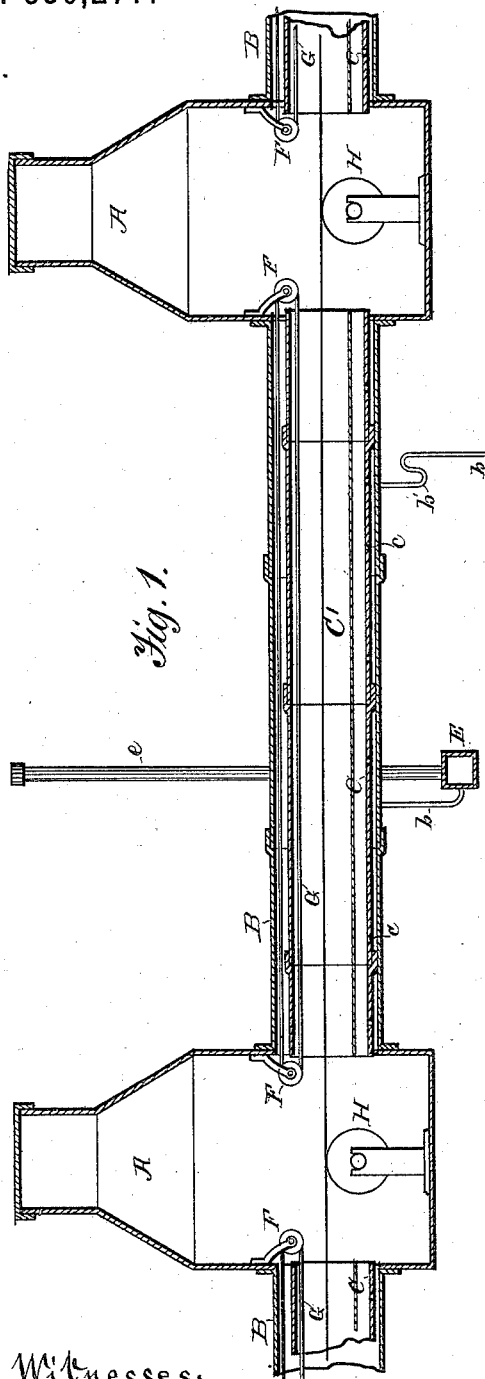
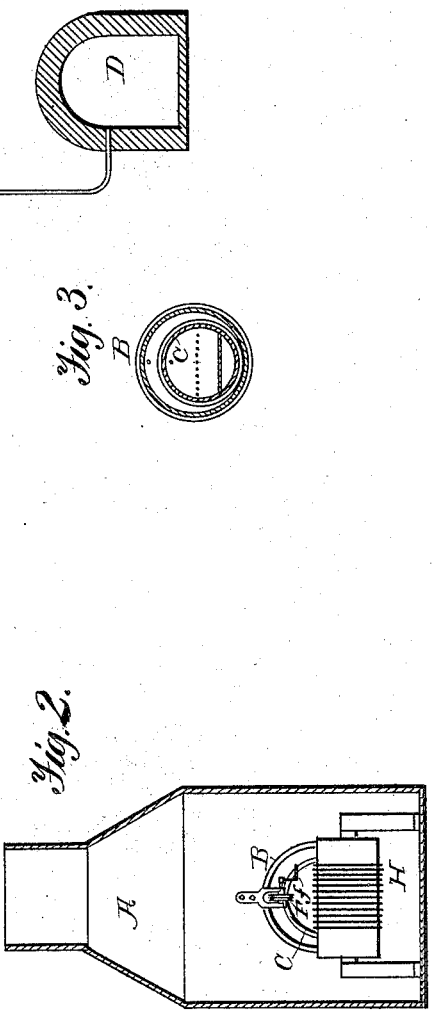

UNITED STATES PATENT OFFICE.

THOMAS D. WILLIAMS, OF BELLEVUE, ASSIGNOR OF ONE-FOURTH TO JOHN M. BOGGS AND WILLIAM R. KIRKPATRICK, BOTH OF PITTSBURG, PA.

UNDERGROUND CONDUIT FOR ELECTRIC WIRES.

SPECIFICATION forming part of Letters Patent No. 330,277, dated November 10, 1885.

Application filed July 3, 1885. Serial No. 170,583. (No model.)

*To all whom it may concern:*

Be it known that I, THOMAS D. WILLIAMS, a citizen of the United States, and a resident of Bellevue borough, in the county of Allegheny and State of Pennsylvania, have invented certain new and useful Improvements in Conduits for Telegraph, Telephone, and other Wires, of which the following is a full, clear, and exact description.

The object of my improvement is to construct a conduit for telegraph and other wires, which shall be dry, and provided with means for conducting condensed moisture away from the wires and out of the conduit; means for laying or taking up wires and examining any particular wire without excavating the earth under which the conduit is laid and without interfering with the other wires, and means whereby the tapping of the conduit at any point and making local connections with any particular wire is facilitated.

The invention consists in the instrumentalities hereinafter set forth for attaining said object.

In the drawings, Figure 1 represents a longitudinal vertical section of my improvement; Fig. 2, a transverse vertical section of one of the man-holes; Fig. 3, a cross-section of the conduit-pipes.

Similar letters of reference indicate corresponding parts throughout the different views.

A represents a man-hole of any suitable construction, to which is secured one extremity of a pipe, B. The latter is of ordinary construction, and its sections are jointed in any suitable manner. Within said pipe B, and resting upon the bottom of the same, is a second pipe, C, whose joints overlap those of pipe B. Said pipe C is of considerably smaller diameter than pipe B, and its joints only touch the bottom of the latter at points, thus allowing free passage along the space between the pipes for water. The bottom of pipe C is perforated at intervals at $c$, and a floor, $c'$, is laid loosely within each pipe.

By the foregoing construction it will be seen, first, that by overlapping the joints of the pipes, in case of leak in two contiguous joints of the two pipes, entering water will not reach the interior of pipe C, but be conducted off along the space between the two pipes; and, second, that moisture condensed within pipe C will pass through perforations $c$, and be conducted off in the same manner. Connected with the bottom of pipe B are vent-pipes $b$. Where possible, these pipes are provided with a siphon, $b'$, and run directly into a sewer, as at D. Where this is impractical, said pipes are connected with a box, E, provided with a pipe, $e$, running to the surface of the ground. Through said pipe $e$ the water may be pumped from the box whenever desired.

Within the man-holes A, and secured to brackets attached to the sides of said manholes, are winding-pulleys F, provided with cranks $f$. About said pulleys pass endless belts or wires G. The upper halves of said belts lie between the two pipes B C, while the lower halves lie entirely within pipes C.

The purpose and operation of the belts and pulleys are as follows: When it is desired to lay a wire, it is attached to the under half of the belt G, and the pulley F is revolved by means of its crank until the wire has been carried to the next man-hole. The wire is then detached and secured to the belt connecting with the next man-hole, and this belt operated in the same manner. This series of operations is continued until the wire has been dragged to its destination. The position of the upper half of the belt between the two pipes prevents it from being brought in contact and interfering with the passage of the wire.

Secured to the bottom of the man-holes are uprights, which carry drums or spools H. Around these drums each wire is given a turn as it is passed through the man-hole when being laid. When it is desired to make local connection with any particular wire, a hole is drilled through both pipes B C at the desired point. The wire is then slipped off the drums at one or both of the adjacent man-holes. This creates a slack in the particular wire, and allows it to be drawn out through the hole and connected with the local wire. The local wire is then passed through a pipe, and the latter screwed into the hole.

Where a leak occurs along any of the line-wires, the same may be located (in the ordinary manner) by passing from man-hole to man-hole until found. The wire is then cut at one of the two man-holes between which the leak occurs, and drawn to the other man-hole. It is there repaired, or a new section joined on, drawn back to the first man-hole, and connected up.

In laying the conduits the vent-pipes are connected with each section lying between two man-holes at its lowest point. The man-holes are, on the other hand, situated at the highest available point.

At each of the man-holes each wire as laid is provided with a metallic tab bearing a letter or other mark by means of which any particular wire may be at any time identified.

Any desired kind of insulated wire—kerite, or ordinary cotton-wrapped—may be used in conjunction with my improvement.

Having thus described my invention, what I claim as new is—

1. In underground conduits, the man-holes A, outer pipes, B, having their ends surrounding side holes in said man-holes, and interior pipes, C, having their ends in said holes, all combined and arranged to form a water-passage between the pipes, and emptying into said man-holes, as described.

2. The combination, with the pipes B C and pulleys F, of the belt G, the upper half of said belt lying between the two pipes, substantially as described, whereby the wire and the oppositely-moving half of the belt are prevented from conflicting, as set forth.

THOS. D. WILLIAMS.

Witnesses:
W. D. THOMAS,
LENOX SIMPSON.